United States Patent Office 3,163,941
Patented Jan. 5, 1965

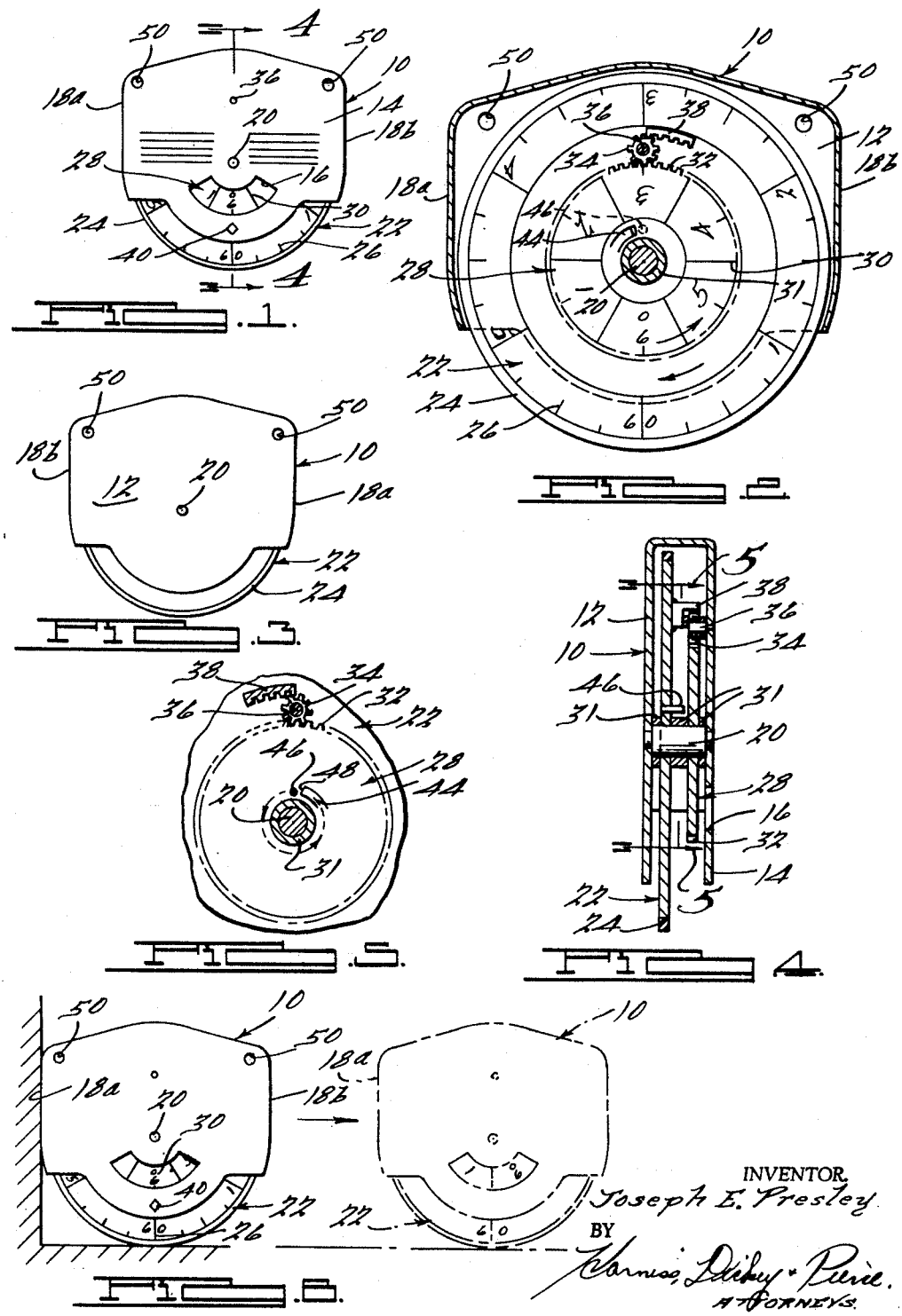

3,163,941
ROLLER CONTACT DISTANCE MEASURING
DEVICE
Joseph E. Presley, 543 St. Ann St., New Orleans, La.
Filed Aug. 25, 1961, Ser. No. 133,923
5 Claims. (Cl. 33—141)

The present invention broadly pertains to rotary measuring devices, and more particularly to an improved simplified and reliable measuring instrument for measuring distances along straight and arcuate paths.

A variety of so-called rotary measuring instruments or devices have heretofore been used or proposed for use but because of one or more inherent disadvantages therein have failed to receive widespread acceptance and use. Measuring devices of this general class are superior in many measuring situations to the more conventional measuring instruments such as tape measures, folding or zigzag carpenter rules, rulers or yardsticks, and the like. For example, the measurement of the length of an arc or of a line having a compound curvature therein is exceedingly difficult and in some cases impossible to measure by such conventional measuring devices. A similar problem is encountered on attempting to measure a line across an undulating surface. A measurement of distances in excess of the length of these fixed-length measuring devices necessitates a repeated marking of the surface and movement of the rule or tape resulting in a multiple step measurement which becomes particularly tedious when distances of a substantial length are being measured. Moreover, such a multiple step measurement introduces an error each time the rule or yardstick is moved which can constitute a significant cumulative error in the final measurement.

A further disadvantage of conventional rule type measuring devices is their relatively large size which prevents convenient portability thereof in a pocket, for example, when not in use. This disadvantage has somewhat been overcome by the use of flexible tapes and a folding carpenter's rule but in each of these cases the rule must be either unrolled or unfolded prior to use and subsequently re-rolled or folded at the completion of a measurement.

It is accordingly a principal object of the present invention to provide an improved rotary measuring device which overcomes the disadvantages and inconvenience inherent in conventional measuring instruments such as tape measures, folding carpenter rules, yardsticks, and the like of the types heretofore known.

Another object of the present invention is to provide an improved rotary measuring device which can be calibrated in any desired measurement system and which is applicable for accurately and uninterruptedly measuring distances of any length regardless of whether the surface is planar or undulating and regardless of whether the path of measurement is straight or arcuate.

Still another object of the present invention is to provide an improved measuring device which is eminently satisfactory for measuring distances between confined end points such as so-called "inside measurements" which are exceedingly difficult to achieve with conventional flexible and non-flexible rules.

A further object of the present invention is to provide an improved measuring device of the rotary type which, on the completion of a measurement maintains a record of the measurement on indicator dials thereon obviating the necessity of memorizing or writing down the measurement as in the case of other measuring devices heretofore known.

Still a further object of the present invention is to provide an improved measuring device which, on the completion of a measurement, is quickly and accurately reset to a zero position preparatory for the next measurement simply by rotating the traction wheel in an opposite direction through less than one revolution thereof.

Yet still another object of the present invention is to provide an improved measuring device which is of compact design and of light weight enabling it to be simply carried in one's pocket, is of durable, reliable, and accurate operation; and is of economical manufacture.

The foregoing and other objects and advantages of the present invention are achieved by providing a measuring device employing a traction wheel rotatably mounted in a casing which is provided with indicia thereon and is drivingly connected to a second disk rotatably mounted in the casing for moving the second disk through a predetermined angular increment on each complete revolution of the traction wheel wherein the indicia on the second disk read in combination with the indicia on the traction wheel totalize the measurement. The measuring device is further characterized as employing a casing of a symmetrical configuration whereby inside measurements can be simply achieved by adding a unit measurement corresponding to one-half the width of the casing to the net reading obtained. The measuring device comprising the present invention further incorporates coacting means therein which are operative to simultaneously reset the indicia on the traction wheel and second disk to a zero position on simple rotation of the traction wheel through an angular increment of less than one revolution preparatory to the next measuring operation.

Other objects and advantages of the present invention will become apparent from the following detailed description taken in conjunction with the accompanying drawings, wherein:

FIGURE 1 is a front elevation view of the face of a measuring device constructed in accordance with the preferred embodiments of the present invention;

FIG. 2 is a front elevation view of the measuring device shown in FIG. 1 with the face of the casing removed and illustrating the relationship of the measuring disks therein;

FIG. 3 is an elevation view of the back of the measuring device shown in FIG. 1;

FIG. 4 is a vertical transverse sectional view through the measuring device shown in FIGURE 1 and taken substantially along the line 4—4 thereof;

FIG. 5 is a sectional view through the measuring device shown in FIG. 4 and taken along the line 5—5 thereof and illustrating in particular the resilient engaging ramp formed on the rear surface of the second disk, and FIG. 6 is an illustration of the measuring device in actual use for measuring an inside measurement.

Referring now to the drawings and as is best seen in FIGURES 1 through 5, an exemplary measuring device embodying therein the features of the present invention comprises a three-dimensional housing or casing generally indicated at 10 comprising a back 12 and a face 14 having an arcuate viewing aperture 16 therethrough. The casing 10 is provided with a pair of side edges 18a, 18b at least a portion of which are of a substantially flat and straight configuration and are disposed in spaced substantially parallel relationship with respect to each other. The distance between the flat portions of the side edges 18a, 18b preferably comprises a distance corresponding to two units of measurement whereby inside measurements can be readily made simply by positioning the measuring device so that one of the side edges is disposed adjacent to a wall as shown in FIG. 6, and one or two units of measurement are added to the total measurement registered on the dial.

A shaft 20 is positioned equidistant between the side edges 18a, 18b, and extends between and is mounted on the back 12 and face 14 of the casing 10. A first measuring disk or traction wheel 22 is rotatably mounted on the shaft 20 and the lower portion thereof extends beyond and through the bottom opening of the casing 10 as shown in the drawing. The periphery of the traction wheel 22 is preferably provided with a suitable rim or tire 24 of a suitable non-slipping wear-resistant material such as rubber, for example, which is adapted to be disposed in rolling contact with the surface of an article to be measured. Suitable indicia 26 extend around the traction wheel 22 adjacent to the periphery thereof. The indicia 26 may be in any suitable measuring system including the English system and the metric system. In the specific measuring device shown in the drawings, the indicia 26 are in inches and in fractions thereof. The lower edges of the face 14 and back 12 of the casing are preferably of a circular contour concentric to the traction wheel 22 and exposing the indicia therealong.

A second measuring disk 28 is rotatably mounted on the shaft 20 and is disposed between the traction wheel 22 and the rear surface of the face 14 of the casing 10. The second disk 28 is provided with a series of calibrations or indicia 30 extending therearound and disposed so that a portion thereof are readily visible through the viewing aperture 16 in the face 14. The units employed in the indicia 30 of the second disk 28 correspond to larger units in the same system employed for the indicia 26 on the traction wheel 22. For example, if the indicia 26 on the traction wheel are in terms of centimeters, the indicia 30 on the second disk 28 can conveniently be in terms of meters or decimeters, as desired. In the specific measuring device shown in the drawings, the indicia 30 on the second disk 28 are in terms of feet calibrated in one-half foot increments.

The traction wheel 22 and the second disk 28 are maintained in appropriate longitudinally spaced relationship along the shaft 20 by means of a series of washers or spacers 31 disposed in abutting contact therebetween and against the inside surface of the back 12 and the face 14 of the casing 10 as shown in FIG. 4.

The periphery of the second disk 28 is formed with a plurality of gear teeth 32 which are adapted to be disposed in constant meshing relationship with a pinion gear 34 rotatably mounted on a pin 36 affixed to the face 14 of the casing 10. The traction wheel 22 is provided with a gear segment 38 extending arcuately along a portion thereof which is adapted to mesh with the pinion gear 34 during a portion of each revolution of the traction wheel. The ratio between the gear segment 38, the pinion gear 34, and the gear teeth 32 on the second disk 28 is preselected so that for each revolution of the traction wheel the second disk is angularly rotated through an increment corresponding to a unit or fraction of a unit of the indicia 30 thereon equal to the circumferential length of the traction wheel 22. For example, in the exemplary measuring device shown in the drawings wherein the circumferential length of the traction wheel is equal to 6 inches, the ratio of the gear train is selected so as to provide an angular movement of the second disk 28 corresponding to 30°, effecting thereby a movement of the indicia 30 calibrated in feet of one-half unit or, in other words, one-half foot relative to an indicator arrow 40 imprinted or otherwise fixedly mounted on the face 14 of the casing below the viewing aperture 16. Accordingly, twelve complete revolutions of the traction wheel are necessary to provide one complete revolution of the second disk and providing thereby a total reading of up to six feet.

Alternately, the ratio of the gear train can be increased whereby the second disk 28 is rotated through an angular increment of only 15°, for example, whereby twenty-four complete revolutions of the traction wheel are necessary to effect one complete revolution of the second disk. In such latter case the indicia 30 on the second disk 28 can be calibrated in 15° intervals each corresponding to one-half foot with a total reading of up to 12 feet.

In either case, regardless of the specific ratio of the gear train employed and of the measuring system in which the indicia are calibrated, the gear segment 38 is positioned relative to the pinion gear 34 so that rotation of the second disk, as the result of the coaction therebetween in response to rotation of the traction wheel occurs during a relatively small increment of rotation of the traction wheel and coinciding substantially at the point wherein the traction wheel has completed a complete revolution. This is accomplished by positioning the gear segment 38 so that the trailing edge thereof is in abutting blocking contact against the pinion gear 34 as shown in FIG. 2 when both the zero marks on the indicia 26 and 30 are in the zero position and aligned with the indicator arrow 40.

A typical inside measurement with the measuring device set at zero is shown in FIG. 6. In the position shown, the side edge 10a is disposed in contact with a confining wall of the enclosure being measured and the base of the traction wheel 22 is disposed in contact with the surface to be measured. The zero mark of the indicia 26 on the traction wheel and of the indicia 30 on the second disk 28 are disposed in radial alignment with the indicator arrow 40 preparatory to taking the measurement. The measuring device is thereafter moved to the right as viewed in FIG. 6 wherein the traction wheel rotates in a clockwise direction and upon the completion of one revolution the second disk 28 is rotated in the opposite or counterclockwise direction one-half unit indicating that a total of one-half foot has been elapsed as indicated in phantom in FIG. 6. Further movement of the measuring device toward the right as viewed in FIG. 6 to a point where the traction wheel completes another complete revolution causes the second disk to be rotated through an additional one-half unit wherein the numeral 1 of the indicia 30 thereon will be positioned in alignment with the indicator arrow 40 on the face 14.

At the completion of a measurement the measuring device is quickly and simply reset to a zero position by rotating the traction wheel 22 in a direction opposite to that in which it is rotated for obtaining a measurement. In the specific example shown, the traction wheel is rotated in a counterclockwise direction as viewed in FIG. 6 through an angular increment of less than one revolution depending on the specific setting or angular displacement of the traction wheel and the second disk from a zero position. During this angular movement, both the traction wheel and second disk are automatically and accurately reset to a zero position preparatory to taking of the next measurement.

The automatic resetting of the measuring device is achieved by employing coacting means between the traction wheel and second disk which enables relative rotation of the traction wheel and second disk when the traction wheel is rotated in a measuring direction or a clockwise direction as shown in the drawings. On rotation of the traction wheel in the opposite or counterclockwise direction, as viewed in FIGURE 6, engagement of the coacting means occurs causing both the traction wheel and second disk to rotate together in a counterclockwise direction until the gear segment 38 is rotated into blocking engagement against the pinion gear 34 as shown in FIG. 2. The locking engagement of the coacting means are relatively indexed to each other so as to occur when the zero mark of the indicia 30 on the second disk 28 is disposed in radial alignment with the zero mark of the indicia 26 on the traction wheel 22. At that point both the traction wheel and second disk are interlocked and rotate together as a unit until the blocking engagement between the gear segment and pinion gear occurs at which point the zero mark of the indicia 26 and 30 are disposed in radial alignment with the indicator arrow 40 on the casing.

The coacting means employed as may be best seen in FIGS. 4 and 5 comprise a resilient cam or ramp 44 on the second disk 28 projecting inwardly toward the traction wheel 22. A projection or engaging pin 46 is affixed to the traction wheel 22 at a point spaced from the center thereof corresponding to the radial distance that the resilient ramp 44 is spaced from the center of the second disk. By virtue of this arrangement, on rotation of the traction wheel in a measuring direction, the engaging pin or other projection 46 moves through a circle indicated in dotted lines in FIG. 5 and in the direction of the arrows whereby the resilient ramp 44 is deflected by the pin enabling simple unobstructed passage of the engaging pin relative thereto. On reversal of the direction of rotation of the traction wheel, the engaging pin 46 on coming in contact with the raised end portion 48 of the resilient ramp 44 causes an interlocking coaction therebetween whereby the second disk and traction wheel rotate together in a direction opposite to the direction of arrows indicated in FIG. 5. In view of the fact that the pinion gear 34 is engaged by the gear teeth 32 along the periphery of the second disk 28, rotation is permitted until the point at which the gear segment 38 engages the teeth of the pinion gear 34 resulting in a binding coaction therebetween preventing further unitary rotation of the interlocked traction wheel and second disk. This condition corresponds to the reset condition as indicated by the position of the dials shown in the measuring device in FIG. 6.

The simplicity of operation and construction of the exemplary measuring device comprising the present invention illustrated in the drawings, provides for advantages heretofore unobtainable in measuring devices of similar type heretofore known. The small, lightweight, and compact design of the measuring device enables it to be simply carried in one's pocket or alternately can be suspended from a suitable string or key chain fastened through suitable hollow rivets or apertures 50 in the casing as shown in the drawings. The simplicity of the component parts employed in the measuring device enables the major portion thereof to be manufactured by conventional stamping and blanking operations and thereafter simply assembled providing therewith a low cost accurate measuring instrument.

While it will be apparent that the preferred embodiments herein illustrated are well calculated to fulfill the objects above stated, it will be appreciated that the invention is susceptible to modification, variation and change without departing from the proper scope or fair meaning of the subjoined claims.

What is claimed is:

1. A portable pocket-sized measuring device comprising a casing formed with an open bottom and including a pair of spaced side edges connected by a face having an indicator thereon, a shaft mounted in said casing centrally between said side edges thereof, a first disk rotatably mounted on said shaft having a portion thereof projecting through said open bottom for rolling contact with an article to be measured, said first disk provided with indicia extending therearound and disposed adjacent to the periphery thereof, a second disk rotatably mounted on said shaft adjacent to said face of said casing, said second disk provided with indicia extending therearound and disposed adjacent to the periphery thereof, a circular gear mounted concentrically on said second disk, a pinion gear rotatably mounted in said casing and disposed in constant meshing engagement with said circular gear, a gear segment disposed along an arcuate portion of said first disk and adapted to mesh with said pinion gear during a portion of each revolution of said first disk for rotating said second disk a fraction of a revolution in a direction opposite to the direction of rotation of said first disk, and coacting means indexed on said first and said second disks operative to provide rotation of said first and said second disks relative to each other when said first disk is rotated in one direction and to rotatably interlock said first and said second disks when the zero marks of said indicia thereon are disposed in radial alignment upon rotation of said first disk in the opposite direction providing for concurrent rotation of said first and said second disk to a reset zero stop point wherein said gear segment is disposed in blocking contact with said pinion gear and the zero marks of said indicia are aligned with said indicator on said face.

2. A measuring device as described in claim 1 further characterized by the fact that said first disk is provided with a tire extending around the periphery thereof comprising a substantially wear-resistant and non-slipping material.

3. A portable pocket-sized measuring device comprising a casing formed with an open bottom and including a pair of spaced substantially parallel side edges connected by a face having an indicator thereon and a viewing aperture therethrough, a shaft mounted in said casing and disposed equidistant between said side edges thereof, a first disk rotatably mounted on said shaft having a portion thereof projecting through said open bottom for rolling contact with an article to be measured, said first disk provided with indicia extending therearound and disposed adjacent to the periphery thereof, a second disk rotatably mounted on said shaft adjacent to said face of said casing, said second disk provided with indicia extending therearound and disposed adjacent to the periphery thereof of which a portion is visible through said viewing aperture, said second disk formed with external gear teeth along the peripheral edge thereof, a pinion gear rotatably mounted in said casing and disposed in constant meshing relationship with said gear teeth, an internal gear segment disposed along an arcuate portion of said first disk and adapted to mesh with said pinion gear during a portion of each revolution of said first disk for rotating said second disk a fraction of a revolution in a direction opposite to said first disk, and coacting means indexed on said first and said second disks to provide rotation of said first and said second disks relative to each other when said first disk is rotated in one direction and to rotatably interlock said first and said second disks when the respective zero marks of said indicia thereon are disposed in radial alignment upon rotation of said first disk in the opposite direction providing for concurrent rotation of said first and said second disk to a reset zero stop point wherein said second gear segment is disposed in blocking contact with said pinion gear and the respective zero marks of said indicia are aligned with said indicator on said face.

4. A measuring device as described in claim 3 wherein the distance between said shaft and one of said side edges of said casing corresponds to a unit measurement corresponding to the measuring unit of said indicia on said first disk.

5. A measuring device as described in claim 3 wherein said first disk is of a circumference of 6 inches and said indicia thereon are calibrated in inches and fractions thereof, and wherein said indicia on second disk are calibrated in twelve equal increments of one-half of a foot each and said gear segment is operative to rotate said second disk through an angular displacement of 30° at the completion of each revolution of said first disk.

References Cited in the file of this patent
UNITED STATES PATENTS

| 37,002 | Lawrence | Nov. 25, 1862 |
| 2,129,979 | Westervalt et al. | Sept. 13, 1938 |
| 2,557,481 | Staples et al. | June 19, 1951 |

FOREIGN PATENTS

| 320,014 | Great Britain | Oct. 3, 1929 |